United States Patent [19]

Senoo et al.

[11] 4,358,713
[45] Nov. 9, 1982

[54] BRIGHTNESS CONTROL DEVICE FOR LIGHT EMITTING DISPLAY OF ELECTRONIC METER

[75] Inventors: Tetsuo Senoo, Inagi; Kouichi Kogawa, Yokohama, both of Japan

[73] Assignee: Nissan Motor Co., Ltd., Yokohama, Japan

[21] Appl. No.: 190,831

[22] Filed: Sep. 25, 1980

[30] Foreign Application Priority Data

Sep. 25, 1979 [JP] Japan .................. 54-121969

[51] Int. Cl.³ .......................................... H05B 37/02
[52] U.S. Cl. ...................... 315/291; 315/77; 315/169.1; 315/178; 315/210; 315/295; 315/307
[58] Field of Search ............... 315/77, 169.1, 202, 315/209 R, 291, 307, 178, 201, 210, 250, 294, 295, 312; 340/767

[56] References Cited

U.S. PATENT DOCUMENTS 4,090,189  5/1978  Fisler ........................... 315/169.1
4,241,294  12/1980  Fisler ........................... 315/291

FOREIGN PATENT DOCUMENTS 2728796  1/1978  Fed. Rep. of Germany .
2357142  1/1978  France .
1324853  7/1973  United Kingdom .
1391406  4/1975  United Kingdom .
1568415  5/1980  United Kingdom .

Primary Examiner—Eugene R. La Roche
Attorney, Agent, or Firm—Schwartz, Jeffery, Schwaab, Mack, Blumenthal & Koch

[57] ABSTRACT

A brightness control device for a light emitting display of an automotive vehicle electronic meter wherein the brightness of the light emitting display is controlled in response to the variable duty factor output pulse signal produced by an illumination controller for an illumination lamp of an ordinary meter. A circuit is provided for securing the minimum brightness of the light emitting display. The circuit is rendered operative when a lighting switch is turned off to limit the amplitude of a pulse voltage applied to one terminal of the light emitting display.

15 Claims, 6 Drawing Figures

BRIGHTNESS CONTROL DEVICE FOR LIGHT EMITTING DISPLAY OF ELECTRONIC METER

BACKGROUND OF THE INVENTION

The present invention relates to a brightness control system for an automotive vehicle electronic meter for displaying various measured information by the use of a light emitting display of a fluorescent indicator tube and the like.

There is a growing tendency for electronic meters to be employed to display various measured information in an automotive vehicle, such as residual fuel amount, water temperature, oil pressure, and battery voltage, by using a light emitting display, such as a flourescent indicator tube or a light emitting diode.

Unless the brightness of the light emitting display used in such an electronic meter is properly controlled in response to the ambient light lever, the visibility of the display is spoiled by the reduction of the contrast ratio caused by excessive low intensity or the glare caused by excessive high intensity.

Then, it is conceivable to utilize an illumination controller provided for dimming an illumination lamp of an ordinary meter (such as a speedometer or a tachometer) during the nighttime as a control of the brightness of the light emitting display of the electronic meter in accordance with a variable duty factor pulse signal generated by the illumination controller. The illumination controller is so designed that the duty factor of its output pulse signal varies from 100% to 0%, thereby controlling the intensity of the illumination lamp from zero up to the maximum value.

More specifically, the output terminal of the illumination controller is connected to the ground side terminal of the illumination lamps, therefore, when the output pulse signal of the illumination controller is at its high level, namely, voltage of +12 V, the illumination lamps are turned off since they are not supplied any voltage across their terminals, and when the output pulse signal is at its low level, namely 0V, then the illumination lamps are supplied the driving voltage of 12 V and are turned on. Thus, the illumination lamps are supplied with a periodically interrupted driving current according to the output pulse signal of the illumination controller. The brightness the lamps depends upon the variable duty factor of the output pulse signal.

Accordingly, if the brightness of the electronic meter is controlled night and day in accordance with the pulse signal of the illumination controller alone, it may accidentally happen that during the daytime the illumination brightness will be reduced to the lowest level, namely, the zero level, and that, the display will become completely invisible unlike the case of conventional meters of the needle type.

If a driving current circuit of a light emitting display of an electronic meter is connected merely to an illumination controller of the conventional design, the control of the brightness of an electronic meter during the daytime and the control of both of the illumination lamp of an ordinary meter and the electronic meter during the nighttime becomes impossible.

SUMMARY OF THE INVENTION

According to the present invention, an illumination controller for an illumination lamp of an ordinary meter is used the controller generates a pulse signal having a variable duty factor. A brightness control circuit receives the pulse signal from the illumination controller to generate a pulse voltage. This pulse voltage is applied to or is imposed upon a cathode terminal of a light emitting display of an electronic meter. A minimum brightness securing circuit is provided which is operative when a lighting switch is turned off to limit the amplitude of the pulse voltage to secure the minimum brightness of the light emitting display.

According to another aspect of the present invention, an illumination lamp of the ordinary meter is connected through a switch to the same output terminal of the illumination controller to which the brightness control circuit is connected. This switch is opened when the lighting switch is turned off to disconnect the illumination lamp from the output terminal of the illumination controller, to thereby avoid shortening the output terminal of the illumination controller via the low impedance provided by the illumination lamp.

According to still another aspect of the present invention, the illumination controller has a first output terminal connected to the illumination lamp and a second output terminal connected to the brightness control circuit.

According to a further aspect of the present invention, a nighttime brightness lowering circuit is provided which limits the maximum voltage of the pulse voltage from the brightness control circuit for dimming the light emitting display. The nighttime brightness lowering circuit is operative when the lighting switch is turned on.

Accordingly, an object of the present invention is to provide a brightness control device for an electronic meter which utilizes an existing illumination controller for illumination lamps of ordinary meters. More specifically, the object of the present invention is to utilize the existing illumination controller for the purpose of controlling the brightness of an electronic meter as well as for controlling of the intensity of illumination lamp of an ordinary meter by providing means for securing minimum brightness of the electronic meter when a lighting switch is turned off.

DETAILED DESCRIPTION OF THE INVENTION

A first embodiment of the present invention will now be described with reference to FIGS. 1a and 1b of the accompanying drawings.

Figure 1A:
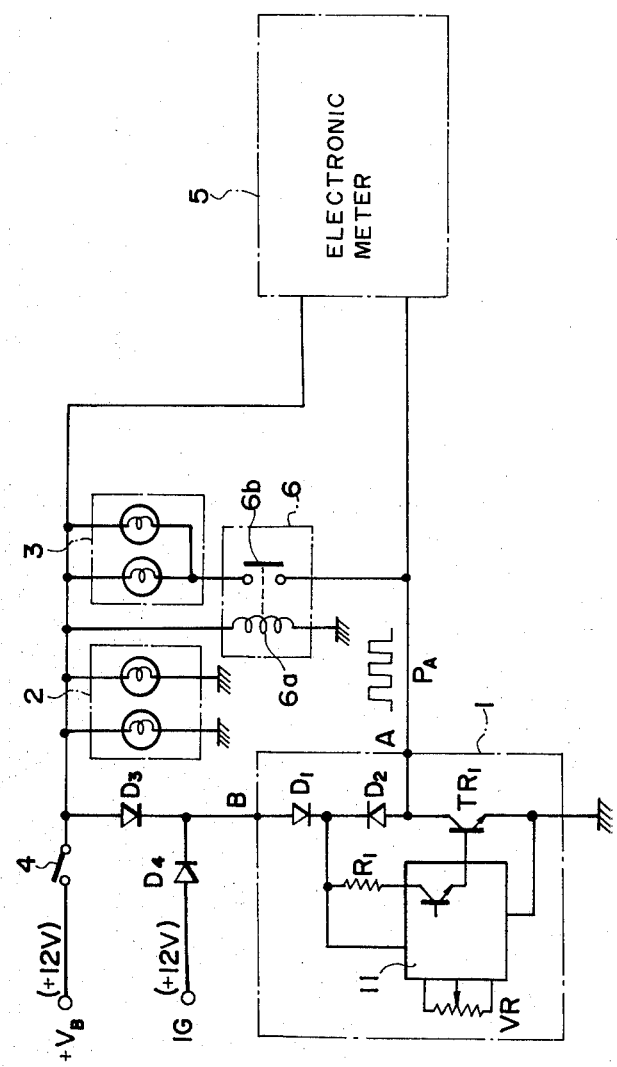
FIGS. 1a and 1b when combined are a circuit diagram depicting a first embodiment of a brightness control device according to the present invention.
Figure 1B:
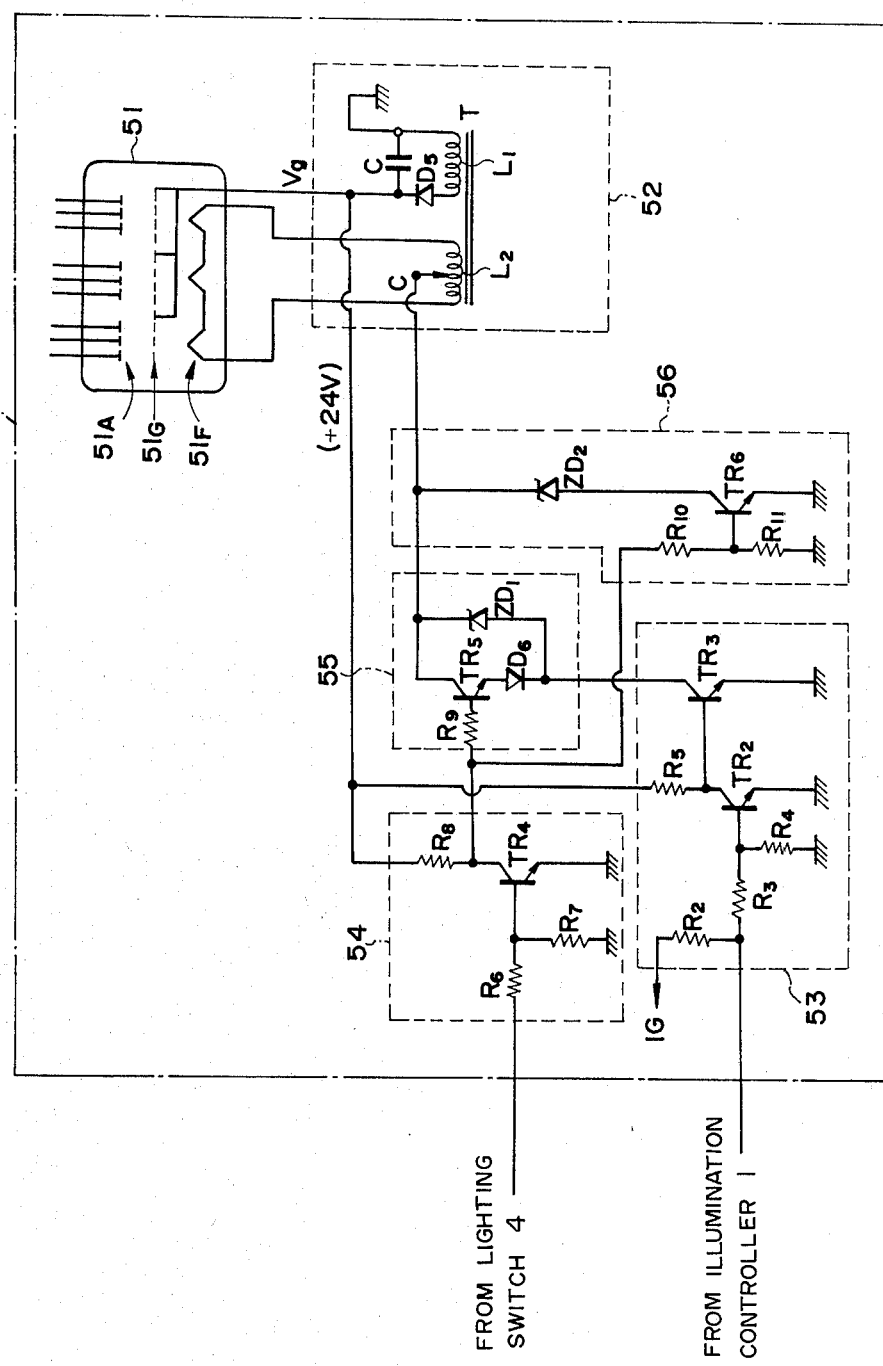

Referring to FIGS. 1a and 1b, there is shown a circuit diagram of the first embodiment of a brightness control device according to the present invention, wherein 1 indicates an illumination controller, 2 indicates lamps which do not need any brightness control such as side marker lamps or tail lamps, 3 indicates lamps which need brightness control such as illumination lamps for ordinary meters in the instrument panel for example a speedometer or a tachometer, 4 indicates a lighting switch, and 5 indicates an electronic meter which employs a light emitting display of a fluorescent indicator tube and wherein that portion of the circuit which is associated with the brightness control of the fluorescent indicator tube is shown.

A relay 6 has a relay coil 6a and normally open contacts 6b, the relay coil 6a is connected in parallel with the lamps 2 and the contacts 6b are interposed between the ground side terminals of the lamps 3 and an output terminal A of the illumination controller 1.

The illumination controller 1 comprises an integrated circuit 11, a transistor $TR_1$, a variable resistor VR for varying the duty factor, a resistor $R_1$, and reverse blocking diodes $D_1$ and $D_2$. A power supply input terminal B of the illumination controller 1 is fed a battery voltage (for example +12 V) through the lighting switch 4 of the lamp circuit via a reverse blocking diode $D_3$, and through an ignition circuit via a reverse blocking diode $D_4$. Transistor $TR_1$ is turned on and off in accordance with a constant repetition frequency pulse signal generated at the integrated circuit 11, the duty factor (pulse width/repetition rate) of which is varied by the adjustment of the variable resistor VR. Thus, the electrical connection between the terminal A and the ground is periodically interrupted with the duty factor controlled to a predetermined value.

At night, the lighting switch 4 is turned on, which causes the lamps 2 and also the relay coil 6a of the relay to be energized. The normally open contacts 6b of the relay 6 are then closed to complete the circuit of the lamps 3, thus turning the lamps 3 on. The brightness of the lamps 3 is controlled in accordance with the duty factor of the pulse signal of the integrated circuit 11, because the curcuit of the lamps 3 is periodically interrupted by the transistor $TR_1$.

Turning now to the electronic meter 5 (see FIG. 1b), in addition to a fluorescent indicator tube 51 and a display power supply circuit 52, there is provided a brightness control circuit 53 for controlling the brightness of the fluorescent indicator tube 51 day and night, a day/night distinction circuit 54 for distinguishing the daytime from the nighttime by the position of the lighting switch 4, a nighttime dimming circuit 55 for reducing the brightness of the fluorescent indicator tube 51 during the nighttime, and a minimum brightness circuit 56 according to the present invention for securing the minimum brightness of the fluorescent indicator tube 51 during the daytime.

The fluorescent indicator tube 51 includes anode segments $51_A$ coated by a fluorescent substance, filaments $51_F$ which act as a directly-heated cathode, and a meshed grid $51_G$. The fluorescent substance on the selected anode segment $51_A$ are supplied with the anode voltage according to the information and is designed to emit light at a brightness proportional to the potential difference between the filaments $51_F$ and the grid $51_G$.

The display power supply circuit 52 generates a voltage to be applied to the grid $51_G$ of the fluorescent indicator tube 51, which may be a D-C voltage of about 24 V, and a D-C or A-C voltage (A-C voltage in this embodiment) to be applied to the filaments $51_F$, which may be a voltage of about 3 V. Only the secondary circuit of a transformer T of the display power supply circuit 52 is illustrated in FIG. 1b. The voltage developed across the terminals of a secondary winding $L_1$ of the transformer T is rectified by the diode $D_5$ and smoothed by the condenser C. The D-C voltage of about 24 V is generated by the above circuit and is applied to the grid $51_G$ as the grid voltage $V_g$ and is further applied to the brightness control circuit 53 and the day/night distinction circuit 54. A heater winding $L_2$ of the transformer T generates an A-C voltage of about +3 V across the terminals of both sides of the center tap CT. This A-C voltage is applied to the filament $51_F$ of the fluorescent indicator tube 51. The brightness of the fluorescent substance on the anode segments $51_A$ is controlled in accordance with the potential difference between the center tap CT and the grid $51_G$ of the fluorescent indicator tube 51.

The brightness control circuit 53 comprises two emitter grounded transistors $TR_2$ and $TR_3$, the base of the transistor $TR_2$ is supplied with a voltage from the ignition circuit through the resistors $R_2$ to $R_4$ and the collector is supplied with a voltage of 24 V through a collector resistor $R_5$. The base of transistor $TR_3$ is coupled to the collector of the transistor $TR_2$. The junction between the resistors $R_2$ and $R_3$ is supplied with a pulse signal $P_A$ from the output terminal A of the illumination controller 1.

Figures 2A, 2B, 2C:
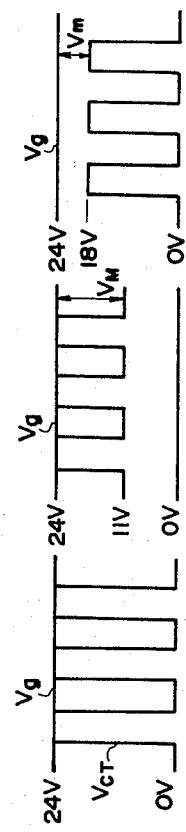
FIGS. 2(a), 2(b) and 2(c) are waveforms occuring during operation of the circuit depicted in FIGS. 1a and 1b.

When the pulse signal $P_A$ is at its high level, the transistor $TR_2$ turns on, causing the transistor $TR_3$ to turn off. And when the pulse signal $P_A$ is at its low level, the transistor $TR_2$ turns off, causing the transistor $TR_3$ to turn on. Assuming that the collector of the transistor $TR_3$ is directly coupled to the center tap CT of the heater winding $L_2$ of the transformer T of the display power supply circuit 52, the volage $V_{CT}$ of the center tap CT will vary between 0 V and 24 V. The frequency and the duty factor of which respectively correspond to each of the pulse signal $P_A$ as is illustrated in FIG. 2(a). When the duty factor of the pulse signal $P_A$ has a value of 0%, the fluorescent indicator tube 51 emits light at its maximum intensity since the brightness of the fluorescent indicator tube 51 varies in proportion to the differential voltage $V_g - V_{CT}$ which will then be 24 volts. When the duty factor of the pulse signal $P_A$ has a value of 100%, the fluorescent indicator tube 51 will not emit any light because the differential voltage $V_g - V_{CT}$ will be 0 volts. However, because there is provided the nighttime dimming circuit 55 and the minimum brightness securing circuit 56, this embodiment, will not operate as explained above.

The day/night distinction circuit 54 comprises resistors $R_6$ and $R_7$ for dividing the battery voltage supplied from the lighting switch 4 and applying it to the base of an emitter grounded transistor $TR_4$, and the collector of which is supplied with a voltage of 24 V through the resistor $R_8$. Thereby daytime and the nighttime are distinguished by the switched positions of the lighting switch 4. In other words, when the switch 4 is switched to the off position, the transistor $TR_4$ turns off, and the collector potential rises up to the high level (+24 V), indicating daytime. When the switch 4 is switched to the on position, the transistor $TR_4$ turns on, and the collector potential of which reduces to the low level (0 V), indicating the nighttime.

The nighttime dimming circuit 55 comprises a transistor $TR_5$ to which is applied the output signal of the day/night distinction circuit 54 (the collector potential of the transistor $TR_4$) through a base resistor $R_9$, a diode $D_6$ interposed between the emitter of the transistor $TR_5$ and the collector of the transistor $TR_3$ of the brightness control circuit 53, and a Zener diode $ZD_1$ connected between the collector of the transistor $TR_5$ and the collector of the transistor $TR_3$ of the brightness control circuit 53. The collector of the transistor $TR_5$ is connected to the center tap CT of the heater winding $L_2$ of the transformer T of the display power supply circuit 52.

The minimum brightness securing circuit 56 comprises resistors $R_{10}$ and $R_{11}$ for dividing the output signal voltage of the day/night distinction circuit 54. The voltage across $R_{11}$ is applied to the base of an emitter grounded transistor $TR_6$. A zener diode $ZD_2$ interposed between the collector of the transistor $TR_5$ and the center tap CT of the heater winding $L_2$ of the transformer T of the display power supply circuit 52.

During the nighttime when the light switch 4 is turned on, the output signal of the day/night distinction circuit 54 falls to its low level, and both the transistor $TR_5$ of the nighttime dimming circuit 55 and the transistor $TR_6$ of the minimum brightness securing circuit 56 are shut off. Thus, the zener diode $ZD_1$ is effectively interposed between the transistor $TR_3$ of the brightness control circuit and the center tap CT of the heater winding $L_2$. Therefore, when the transistor $TR_3$ turns on, the voltage level at the center tap CT does not reduce to 0 but to the zener voltage (for example 11 volt) of the zener diode $ZD_1$ as shown in FIG. 2(b). Accordingly, the differential voltage $V_g - V_{CT}$ at the 0% duty factor of the pulse signal PA has the value $V_M = 24 V - 11 V = 13 V$ so that the brightness of the vacuum fluorescent lamp 51 is reduced by half throughout the brightness control range. Thus, the objectionable nighttime glare is eliminated.

During the daytime when the lighting switch 4 is in the off position, the output level of the daytime and nighttime distinction curcuit 54 is at its high level, so that the transistor $TR_5$ of the nighttime dimming curcuit turns on, thus the zener diode $ZD_1$ is shorted through the diode. Accordingly the dimming operation as discribed above is not actually executed, and the transistor $TR_6$ of the minimum brightness securing curcuit turns on, so that the zener diode $ZD_2$ is effectively interposed between the center tap CT of the heater winding $L_2$ and ground.

Thus, the potential of the center tap CT when the transistor $TR_3$ of the brightness control circuit 53 turns off is limited to the zener voltage of the zener diode $ZD_2$ as shown in FIG. 2(c). Accordingly, since there is a differential voltage $V_g - V_{CT}$ at the 100% duty factor of the pulse signal $P_A$ is $V_m = 24 V - 18 V = 6 V$ in this embodiment, there remains a potential difference of about 6 V between the grid $51_G$ and the filaments $51_F$ of the fluorescent indicator tube 51 even if the brightness is reduced to the lowest level. Thus a brightness around 20% of the maximum value is secured. The diode $D_6$ is provided for applying a slight voltage to the center tap CT when the transistor $TR_3$ turns on.

When the lighting switch 4 is switched to the off position, the coil $6a$ of the relay 6 is deenergized to open the contacts $6b$, and the lamps 3 are isolated from the output terminal A of the illumination controller 1. Consequently the output terminal A of the illumination controller is not clamped to the low level by grounding through the lamps 2 and 3 which have very low impedance.

Thus, the output signal $P_A$ of illumination controller 1 is also utilized for the control of the brightness of the electronic meter during the daytime.

In addition, the A-C voltage of around ±3 V applied to the filaments $51_F$ of the fluorescent indicator tube 51 in the above embodiment, can be replaced by a D-C voltage.

Figure 3:
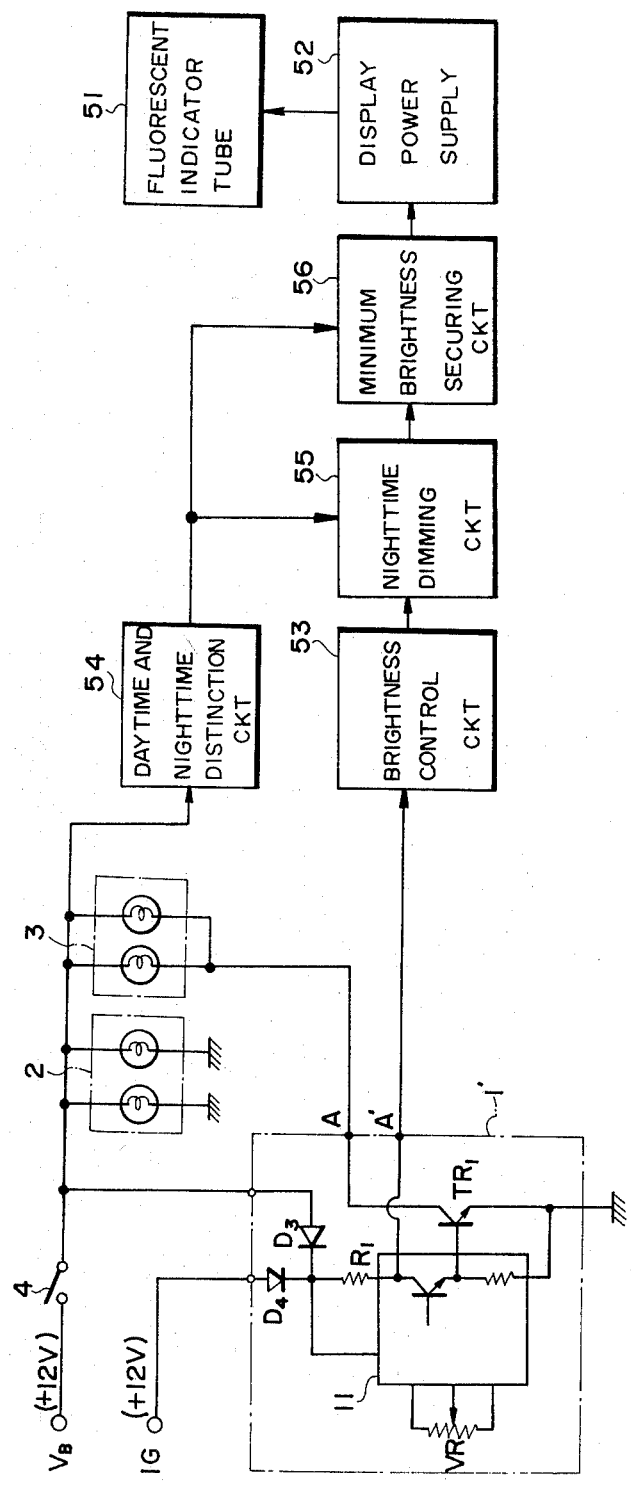
FIG. 3 is a circuit diagram depicting a second embodiment according to the present invention.

The circuit diagram of a second embodiment of the present invention is shown in FIG. 3 wherein each circuit of the electronic meter 5 is represented by the blocks numbered to correspond to similar circuits discussed above. explanation of each is ommitted since it is the same as that of the first embodiment described above.

The second embodiment is characterized in that an illumination controller 1' has the terminal A' for solely controlling the brightness of the electronic meter 5 so that the relay 6 of the first embodiment is ommitted. In addition, the reverse blocking diode D3 is incorporated in the illumination controller 1'.

It should be noted that although the invention is explained by way of the example of of fluorescent indicator tube as the light emitting display of the electronic meter in the above embodiments, the invention is also applicable to the case in which a light emitting diode (LED) or the like is employed as the light emitting display.

And it is further noted that instead of relay 6, other types of switching means such as semiconductor switching devices can be used for disconnecting the lamp load from the illumination controller.

As described in the above embodiment, the brightness of the electronic meter is controlled day and night by the use of a variable duty factor pulse signal of a illumination controller provided for dimming the illumination lamps of ordinary meters during the nighttime. During the daytime, adequate visibility of display is obtained by securing a minimum brightness of from the light emitting display.

Furthermore, the invention can be executed with only nominal cost increase, since only an additional switching means, such as a relay, is required for commonly using the conventional illumination controller to control the brightnes of the electronic meter.

What is claimed is:

1. A brightness control device for a light emitting display of an electronic meter for use with an illumination controller which generates a pulse signal having a variable duty factor and which is connectable to an illumination lamp when a lighting switch is turned on, said brightness control device comprising:
   (a) a brightness control circuit for generating a control pulse volage to be applied to the light emitting display in response to the pulse signal to control the brightness of the light emitting display in response to the duty factor of the pulse signal; and
   (b) a minimum brightness securing circuit for reducing the amplitude of said control pulse voltage when the lighting switch is turned off to secure a minimum brightness of the light emitting display.

2. A brightness control device as claimed in claim 1, further comprising a switch means for disconnecting the illumination lamp from the illumination controller when the lighting switch is turned off.

3. A brightness control device as claimed in claim 2, wherein said switch means comprises a relay having a relay coil connected to the lighting switch and a pair of relay contacts connected between an output terminal of the illumination controller and the ground side terminal of the illumination lamp.

4. A brightness control device as claimed in claim 1, wherein said brightness control circuit is connected to the illumination controller to always receive the pulse signal.

5. A brightness control device as claimed in claim 1, wherein said brightness control circuit applies said control pulse voltage to the light emitting display at a cathode terminal thereof.

6. A brightness control device as claimed in claim 5, wherein said brightness control circuit comprises a transistor connected between a cathode terminal of the light emitting display and ground, the base of said transistor being controlled in response to said pulse signal.

7. A brightness control deivce as claimed in claim 5, wherein said minimum brightness securing circuit limits the maximum voltage of said control pulse voltage applied to the cathode terminal of the light emitting display.

8. A brightness control device as claimed in claim 7, wherein said minimum brightness securing circuit comprises: a series circuit of a zener diode and a switching transistor connected to the cathode terminal of the light emitting display and the ground, and wherein said switching transistor is switched to its conductive state when the lighting switch is turned off.

9. A brightness control device as claimed in claim 1, further comprising a nighttime brightness lowering circuit for limiting the minimum voltage of said control pulse voltage applied to the cathode terminal of said light emitting display for dimming said light emitting display when the lighting switch is turned on.

10. A brightness control device as claimed in claim 9, wherein said nighttime brightness lowering circuit comprises: a zener diode connected between an output terminal of said brightness control circuit and the cathode terminal of the light emitting display; and a switching transistor connected in parallel with said zener diode, and wherein said switching transistor is switched to its conductive state when the lighting switch is turned off.

11. A brightness control device for a light emitting display of an electronic meter of an automotive vehicle, said device comprising:
(a) a lighting switch;
(b) means for generating a pulse signal having a variable duty factor;
(c) means for generating a pulse voltage to be applied to a cathode terminal of the emitting display in response to said pulse signal, said pulse voltage generating means comprising: a transistor connected between a cathode terminal of the light emitting display and ground, a base of said transistor being controlled in response to said pulse signal;
(d) means for securing a minimum brightness of said light emitting display, said minimum brightness securing means comprising: a series circuit of a zener diode and a switching transistor connected to the cathode terminal of said light emitting display and the ground, and wherein said switching transistor is switched to its conductive state when the lighting switch is turned off; and
(e) means for dimming said light emitting display, said dimming means comprising: a zener diode connected between an output terminal of said pulse voltage generating means and the cathode terminal of the light emitting display; and a switching transistor connected in parallel with said zener diode of said dimming means, said switching transistor of said dimming means being switched to its conductive state when the lighting switched is turned off.

12. A brightness control device for a light emitting display of an electronic meter of an automotive vehicle, said device comprising:

(a) a lighting switch;
(b) an illumination controller for generating a pulse signal having a variable duty factor to control the intensity of an illumination lamp connected to a current source through said lighting switch, wherein an output terminal of said illumination controller is connected to a ground terminal of the illumination lamp;
(c) means for disconnecting the illumination lamp from said illumination controller when said lighting switch is turned off, said disconnecting means comprising: a relay having a relay coil connected to a current source through said lighting switch and relay contacts connected between the output terminal of said illumination controller and a ground terminal of said illumination lamp;
(d) a brightness control circuit for generating a pulse voltage in response to said pulse signal to be applied to a cathode terminal of the light emitting display of the electronic meter, said brightness control circuit comprising: a transistor connected between a cathode terminal of the light emitting display and the ground, the base of said transistor being controlled in response to said pulse signal;
(e) a minimum brightness securing circuit for securing a minimuim brightness of the light emitting display comprising: a series circuit of a zener diode and a transistor connected between the cathode terminal of the light emitting display and the ground, said switching transistor being switched to its conductive state when the lighting switch is turned off; and
(f) a nighttime dimming circuit for limiting the minimum voltage of said pulse voltage applied to the cathode terminal of the light emitting display for dimming said light emitting display, said nighttime dimming circuit comprising: a zener diode connected between an output terminal of said brightness control circuit and the cathode terminal of the light emitting display; and a switching transistor connected in parallel with said zener diode, said switching transistor of said nighttime dimming circuit being switched to its conductive state when the lighting switch is turned off.

13. A brightness control device for a light emitting display of an electronic meter of an automotive vehicle, comprising:
(a) a lighting switch;
(b) an illumination controller for generating a pulse signal having a variable duty factor for controlling the intensity of the illumination lamp connected to a current source through said lighting switch, said illumination controller comprising a first output terminal connected to a ground terminal of the illumination lamp and a second output terminal for controlling the brightness of the light emitting display of the electronic meter;
(c) a brightness control circuit responsive to said pulse signal for generating a pulse voltage to be applied to a cathode terminal of the light emitting display of said electronic meter, said brightness control circuit comprising: a transistor connected between a cathode terminal of the light emitting display and ground, the base of said transistor being controlled in response to said pulse signal;
(d) a minimum brightness securing circuit for securing the minimum brightness of the light emitting display comprising: a series circuit of a zener diode and a switching transistor connected to the cathode terminal of said light emitting display and ground, said switching transistor being switched to its conductive state when the lighting switch is turned off; and (e) nighttime dimming circuit for limiting the minimum voltage of said pulse voltage applied to the cathode terminal of said light emitting display for dimming said light emitting display, said nighttime dimming circuit comprising: a zener diode connected between the output terminal of said brightness control circuit and the cathode terminal of the light emitting display; and a switching transistor connected in parallel with said zener diode, said switching transistor of said nighttime dimming circuit being switched to its conductive state when the lighting switch is turned off.

14. A brightness control device for a light emitting display of an electronic meter for use with an illumination controller which generates a pulse signal having a variable duty factor and which is connectable to an illumination lamp of an ordinary meter when a lighting switch is turned on, said brightness control device comprising:

(a) a brightness control circuit for generating a pulse voltage to be applied to the light emitting display in response to the pulse signal to control the brightness the light emitting display in response to the duty factor of the pulse signal; and (b) a minimum brightness securing circuit comprising a series resistor of a zener diode and a switching transistor connected between the cathode terminal of said light emitting display and ground, said switching transistor being switched to its conductive state when the lighting switch is turned off, wherein said brightness control circuit applies said pulse voltage to the light emitting display at a cathode terminal thereof, and wherein said minimum brightness securing circuit limits the maximum voltage of said pulse voltage applied to the cathode terminal of said light emitting display.

15. A brightness control device for a light emitting display of an electronic meter for use with an illumination controller which generates a pulse signal having a variable duty factor and which is connected to an illumination lamp of an ordinary meter when a lighting switch is turned on, said brightness control device comprising:

(a) a brightness control circuit for generating a pulse voltage to be applied to the light emitting display in response to the pulse signal to control the brightness of the light emitting display in response to the duty factor of the pulse signal;

(b) a minimum brightness securing circuit which is operative when the lighting switch is turned off to limit the amplitude of said pulse voltage to secure the minimum brightness of the light emitting display; and (c) a nighttime brightness lowering circuit for limiting the minimum voltage of said pulse voltage applied to the cathode terminal of said light emitting display for dimming said light emitting display when the lighting switch is turned on, wherein said nighttime brightness lowering circuit comprises: a zener diode connected between an output terminal of said brightness control circuit and the cathode terminal of the light emitting display, and a switching transistor connected in parallel with said zener diode, said switching transistor being switched to its conductive state when the lighting switch is turned off.

* * * * *